United States Patent [19]

Chen

[11] Patent Number: 4,929,660

[45] Date of Patent: May 29, 1990

[54] ACRYLIC ADHESIVE COMPOSITIONS HAVING IMPROVED STABILITY

[75] Inventor: Samuel J. Chen, Lexington, Mass.

[73] Assignee: The Kendall Company, Boston, Mass.

[21] Appl. No.: 839,759

[22] Filed: Mar. 14, 1986

[51] Int. Cl.$^5$ .............................................. C08L 5/32
[52] U.S. Cl. ..................................... 524/236; 523/176
[58] Field of Search ...................... 524/236; 523/176; 560/4

[56] References Cited

U.S. PATENT DOCUMENTS

| | | | |
|---|---|---|---|
| 3,148,225 | 9/1964 | Albert | 524/236 |
| 3,222,334 | 12/1965 | Demme | 526/340 |
| 3,408,422 | 10/1968 | May | 560/4 |
| 3,426,063 | 2/1969 | Gros | 560/4 |
| 3,432,578 | 3/1969 | Martin | 524/236 |
| 3,644,244 | 2/1972 | Fryd et al. | 524/236 |
| 3,697,470 | 10/1972 | Haines et al. | 524/236 |
| 3,821,304 | 6/1974 | Klemchuk | 524/236 |
| 3,926,909 | 12/1975 | Wei | 524/236 |
| 4,262,106 | 4/1981 | Frauenglass et al. | 523/176 |
| 4,540,738 | 9/1985 | Zimmerman | 524/707 |

Primary Examiner—Veronica P. Hoke

[57] ABSTRACT

Adhesive compositions comprising at least one free radical acrylic monomer and a free radical initiator, which compositions further include a stabilizer mixture for improving shelf life comprising a polymerization inhibitor, a metal chelating agent, and a free radical scavenger, the stabilizer mixture being present in an amount sufficient to inhibit gelation during shelf life of the composition.

8 Claims, No Drawings

ACRYLIC ADHESIVE COMPOSITIONS HAVING IMPROVED STABILITY

BACKGROUND OF THE INVENTION

U.S. Pat. No. 4,540,738 issued to Zimmermann, Sept. 10, 1985 and assigned to The Kendall Company, assignee of the present invention, relates to improving the stability of acrylic adhesive compositions comprising a free radical polymerizable acrylate or methacrylate monomer and an initiator. In general, the adhesive compositions to which the patented invention are directed may be described as "two part adhesive compositions" which when admixed with an activator polymerize to provide a solid adhesive possessing excellent physical properties.

As stated therein, these polymerizable adhesive compositions tend to gel during storage, thereby materially limiting their shelf life. In general, this tendency to gel or polymerize in storage increases as the temperature increases. Conversely, lower temperature storage of the adhesive material results in an extension of the shelf life. Accordingly, refrigeration prior to use is often required. However, this technique to increase adhesive shelf life is not only cumbersome and expensive, but also requires rewarming prior to use to attain a reasonable cure rate.

To obviate this problem, procedures are known in the prior art for the addition of various stabilizers in lieu of refrigeration. Ideally, these additives should impart the desired shelf life without adversely affecting the adhesive properties. However, many of these additives tend to lower the cure speed and/or the adhesive strength.

According to the patented invention, a stabilizing system is incorporated in the acrylic composition comprising effective amounts of a polymerization inhibitor, specifically hydroquinone, and a metal chelating agent, specifically an alpha amino phosphonic acid or alkali metal salt thereof.

However, quite surprisingly, for reasons which are not clearly understood, the invention described in U.S. Pat. No. 4,540,738 has been found not to be applicable for reproducible large scale production, thereby precluding commercialization of the adhesive compositions. Specifically, the patented stabilizing system has been found not to consistently prevent gelation during storage at room temperature or higher.

The present invention is directed to a solution to the problem in manufacture of the stabilizing system of U.S. Pat. No. 4,540,738 and, in this context, may be said to be an improvement over the invention described and claimed therein.

BRIEF DESCRIPTION OF THE INVENTION

In accordance with the present invention, the forementioned problem is obviated and the requisite shelf life obtained by including in the aforementioned stabilizer mixture, a scavenger for free radicals, preferably an N,N-dialkyl- or N,N-diarylalkyl hydroxylamine. The stabilizer mixture for improving shelf life will accordingly comprise effective amounts of a polymerization inhibitor; a metal chelating agent; and the above-noted hydroxylamine, the preferred being N,N-dibenzylhydroxylamine (DBHA). As used herein and in the appended claims, the term "effective amounts" denotes amounts sufficient to prevent premature gelation during an acceptable shelf life period of time, e.g. for at least six months.

In the most preferred embodiments, in accordance with the teachings of the aforementioned U.S. Pat. 4,540,738, the polymerization inhibitor is a hydroquinone (p-dihydroxybenzene); and the chelating agent is an alpha amino phosphonic acid or an alkali metal salt thereof.

DETAILED DESCRIPTION OF THE INVENTION

As previously mentioned, the present invention is directed primarily to providing, on a production scale, consistently reproducible improved shelf life to acrylic adhesive compositions including an acrylate or methacrylate free radical polymerizable monomer, a free radical initiator and a stabilizing system comprising a mixture of effective amounts of a hydroquinone and an alpha amino phosphonic acid or alkali metal salt thereof.

In the adhesive compositions to which this invention is directed, the acrylate monomers constitute the essential ingredients and accordingly the acrylate monomers, i.e. esters of acrylic and/or methacrylic acids are the major components, the latter being generally preferred. These esters may be derived from monofunctional or polyfunctional alcohols, the latter being crosslinkable. A large number of useful monomers, both monofunctional and polyfunctional, are commercially available and per se known in the acrylic adhesive art. As is well understood by those skilled in the art, selection of the particular monomer or mixtures of monomers to be employed will depend upon such factors as the contemplated use of the adhesive, substrates to be bonded, viscosity desired, etc.

As examples of useful monofunctional monomers, heretofore employed in acrylic adhesives, mention may be made of methyl methacrylate; hydroxyethyl methacrylate; tetrahydrofurfuryl methacrylate; trimethyl cyclohexyl methacrylate; cyclohexyl methacrylate; methacrylic acid; isobornyl methacrylate; ethoxyethyl methacrylate; discyclopentenyloxyethyl methacrylate; butyl methacrylate; diethylaminoethyl methacrylate; dimethylaminoethyl methacrylate; 2-ethylhexyl methacrylate; glycidyl methacrylate; hydroxypropyl methacrylate; tert-butylaminoethyl methacrylate; acrylic acid; n-butylacrylate; diethylaminoethyl acrylate; dimethylaminoethyl acrylate; 2-ethylhexyl acrylate; ethoxyethyl acrylate; hydroxypropyl acrylate; isobornyl acrylate; methoxyethyl acrylate; phenoxyethyl acrylate; teterahydrofurfuryl acrylate, etc.

Useful polyfunctional acrylics heretofore employed include trietylene glycol dimethacrylate; 1,6-hexanediol diacrylate; 1,3-butylene glycol dimethacrylate; 1,4-butylene glycol dimethacrylate; 1,12-dodecanediol dimethacrylate; butanediol dimethacrylate; diethylene glycol dimethacrylate; ethylene glycol dimetharcylate; neopentyl glycol dimethacrylate; polyethylene glycol dimethacrylate; trimethylolpropane trimethacrylate; butylene glycol diacrylate; diethlene glycol diacrylate; 1,6-hexanediol diacrylate; neopentyl glycol diacrylate; pentaerythritol triacrylate; tetraethylene glycol diacrylate; trimethylolpropane triacrylte; triethylene glycol diacrylate; tripropylene glycol diacrylate, etc.

As is known, acrylic adhesive formulations such as herein contemplated may additionally have minor amounts of non-acrylic monomers providing desired modifications of physical properties to the adhesive. As examples of such non-acrylic monomers, mention may be made of N-vinyl pyrrolidone; vinyl monomers; acrylamides; alkyl monomers, etc.

Other useful monomers will include the acrylate and methacrylate esters of oligomers prepared by reacting epoxy- or isocyanate-terminated with hydroxyl- containing monomers, e.g. methacrylates obtained by reacting hydroxyethyl- or hydroxypropyl methacrylate with urethane prepolymers obtained by reaction of an excess of diisocyanate with a polyester or polyether glycol. Such methacrylate oligomers may, for example, have a molecular weight on the order of from about 400 to about 4000. Useful urethane-acrylates/methacrylates include those described in U.S. Patent Nos. 3,425,988 and 4,018,851.

Similarly it is known in the art that the polymerizable acrylic adhesive compositions may include a polymeric filler serving to modify the adhesive properties. Such additives are typically referred to in the adhesive art as "impact modifiers" or, simply, as "tackifiers." The amount of polymer employed will vary according to the desired properties and functional, and will in general be on the order of from about 5–60 percent by weight of the reactive ingredients of the compositions, although a range from about 15–30 percent is more typical for most commercial adhesives.

As examples of such useful polymers, mention may be made of Estane 5712 (trademark of B.F. Goodrich) for a polyester-methylene phenyldiisocyante-based resin; triblock copolymers such as the Kraton (trademark of Shell Oil Company) series, linear thermoplastic polyurethanes, ethylene-acrylate copolymers; natural and synthetic rubbers, such as chlorosulfonated polyethylenes; butadiene-acrylonitrile copolymers, etc.; as well as various known oligomers.

The acrylic adhesive formulations to which this invention is directed may also contain various reagents performing specific desired functions, e.g. fillers such as glass or resin beads, calcium oxides, colloidal silica, aluminum oxide, etc; pigments such as titanium dioxide, hydrocarbon black, FD&C aluminum Lake Blue #1, a blue pigment, etc.

To promote polymerization of the acrylic two-part adhesives to which this invention is directed, a free radical initiator is incorporated in an amount sufficient to initiate polymerization and, in turn, cure of the adhesive composition. Preferred free radical initiators are those with high temperature ten hour half lives, e.g. the hydroperoxides of the formula ROOH, where R is a hydrocarbon radical containing up to 18 carbon atoms. Typical examples of such initiators include cumene hydroperoxide, t-butyl hydroperoxide, 2-5-dimethyl bexane peroxide, etc., cumene hydroperoxide being particularly preferred. Additionally, blends of hydroperoxides with peresters, such as t-butyl perbenzoate, or t-butyl peroxymaleate may be employed. The amount of initiator used may vary and will, in general, be on the order of from about 1 to about 10 percent by weight, with amounts from about 2 to about 4 percent being preferred. Additionally, blends of hydroperoxides with peresters, such as t-butyl perbenzoate, or t-butyl peroxymaleate may be employed. The amount of initiator used may vary and will, in general, be on the order of from about 1 to about 10 percent by weight, with amounts from about 2 to about 4 percent being preferred.

In two-part acrylic adhesives of the foregoing description, polymerization and cure is effected by admixing the adhesive composition (first part) with a second part or separate composition containing an activator. This activator may be physically mixed with the adhesive composition just prior to use or, in lieu thereof, mixture may be effected simply by applying the activator composition to one of the substrates to be adhered and the adhesive composition to the other.

Useful activators known in the art include aldehyde-amine condensates, such as VANAX 808 (trademark of R.T. Vanderbilt Company) or tertiary amines such as dimethylanine, transition metal salts of acetylacetonates, or thioureas such as tetramethyl thioureas or acetyl thiourea.

In general, the foregoing description is by way of background to explain the acrylic adhesive formulations to which this invention is directed. Such compositions are per se known in the art and accordingly comprise no part of this invention. The selection of particular acrylic monomers, polymers, additives, initiators, activators, etc. will therefore be understood to be well within the expected judgment of the skilled worker.

As is discussed in the aforementioned U.S. Pat. No. 4,540,738, acrylic compositions of the foregoing description containing at least one free radical polymerizable acrylate or methacrylate ester as well as a free radical initiator tend to exhibit poor stability, manifesting gelation during the anticipated shelf life prior to use.

According to the patentee this problem is obviated by including in the adhesive composition a stabilizing mixture of: (a) a hydroquinone; and (b) an alpha amino phosphonic acid, or an alkali metal salt thereof, e.g. a sodium salt.

The hydroquinones herein contemplated include hydroquinone and nuclear substituted derivatives thereof which provide an inhibiting function against premature and unwanted polymerization which is manifested as a gel formation. Accordingly, as used herein and in the appended claims, the term "hydroquinone inhibitor" is intended to include nuclear substituted derivatives which exhibit an inhibiting function as well as hydroquinone (1,4-dihydroxybenzene) itself. Thus, the word "inhibitor" is to be construed as a material limitation. It follows, therefore, that any substituted derivatives which do not provide an inhibiting function are inoperative, in the context of this invention, and are consequently not within the scope of the appended claims.

Typical substituted derivatives which may be employed are those nuclear carbon atom substituted derivatives disclosed in Table 1 in Col. 6 of the patent, i.e. the t-butyl, methyl, di-t-butyl, di-t-amyl and trimethyl derivatives of hydroquinone. As is seen from this Table, while all of these components provide significant improvement in shelf life, hydroquinone is clearly preferred.

As mentioned, attempts to manufacture a two-part adhesive formulation stabilized in the foregoing manner have not been successful. While the laboratory test data as set forth in the patent specification demonstrates the shelf life stability which is the task of the patented invention, quite surprisingly to the involved research staff of the assignee of the patented invention, scaling up for production runs resulted in poor shelf life, e.g. visible gelation within periods as short as, say seven days.

The task of the present invention accordingly can be said to be the solution to this unexpected stability problem in scaling up for production runs.

It has now been discovered that this premature gelation during storage is caused by free radical formation, notwithstanding the presence of a polymerization inhibitor, i.e. a hydroquinone as taught in the aforementioned U.S. Pat. No. 4,540,738. Having determined the cause or source of the problem, the present invention solves the task by incorporating a free radical scavenger in the stabilizing mix.

In the preferred embodiments, this free radical scavenger will comprise an N,N-dialkyl- or N,N-diarylalkyl hydroxylamine.

As examples of useful hydroxylamines of the foregoing description, mention may be made of N,N-diethyl hydroxylamine and N,N-dibenzyl hydroxylamine. Since the dibenzyl has been found to give somewhat better results, diarylalkyls such as the dibenzyl are accordingly preferred.

While not wishing to be limited to any particular theory, it is believed that the superior results obtained, for example, with N,N-dibenzyl hydroxylamine is due to the electron withdrawing capability of the aromatic (phenylene) nuclei, as compared to the e- donating nature of an alkyl group.

It will be noted that only two illustrative hydroxylamines are disclosed above. These are the only two that Applicant has tested, simply because they were the only two available. However, Applicant believes that at least the alkyl homoloques having from 1-8 carbon atoms should be useful as well; and that useful diarylalkyls will include both the benzene and naphthalene series, i.e. dibenzyl or dinaphthylmethyl and nuclear substituted derivatives thereof.

In any event, as defined in the appended claims, the invention will include the material limitation that the recited hydroxylamines are free radical scavengers. It therefore follows that any yet to be tested N,N-dialkyl or N,N-diarylalkyl hydroxylamines which are structurally within the scope of the recited definition but are not free radical scavengers are not herein contemplated and are accordingly outside the scope of the appended claims. Whether or not a particular contemplated hydroxylamine is in fact a free radical scavenger and thereby provides the stabilizing function will involve routine experimentation within the expected judgment of the skilled worker in the light of the foregoing description.

As previously discussed, the present invention is directed to acrylic adhesive compositions comprising at least one free radical acrylic monomer, e.g. an acrylate or methacrylate ester, which compositions are characterized as having poor shelf life, the essence of the invention being including in these compositions a stabilizing mixture comprising effective amounts of polymerization inhibitor, a metal chelating agent and a scavenger for free radicals. By way of illustration, it has been found that from about 0.03 to 0.10 percent by weight of each of a hydroquinone polymerization inhibitor; an alpha amino phosphonic acid chelating agent, and the aforementioned hydroxylamine scavenger will constitute effective amounts of the stabilizing mixture.

The following example shows by way of illustration and not by way of limitation a useful adhesive composition including the novel stabilizing system of this invention.

EXAMPLE 1

Preparation of:

| | WEIGHT % |
|---|---|
| Tetrahydrofuran methacrylate (THFMA) | 66.5 |
| Triethyleneglycol dimethacrylate (TEGDMA) | 8.0 |
| Methacrylic acid (MAA) | 7.5 |
| Estane 5712 (polymeric modifier) | 15.0 |
| Cumene hydroperoxide (initiator) | 3.0 |
| Hydroquinone (HQ) | 0.05 |
| Aminotri(methylene phosphonic acid) (NTMPA) | 0.05 |
| N,N-Dibenzylhydroxylamine (DBHA) | 0.05 |

The THFMA and HQ were placed in a closed glass reaction vessel heated over a water bath. The Estane 5712 was then added with mixing, while maintaining the temperature at about 55° C until dissolution (about 120 minutes). The temperature of the reaction vessel was then lowered to below about 40° C and the MAA, TEGDMA and NTMPA were then added. The resulting mixture was then stirred, while maintaining the temperature, until solution (about 30 minutes), after which the temperature was lowered to about 30° C and the cumene hydroperoxide was added and stirred until dissolved (about 30 minutes).

It will be noted that the adhesive composition of the foregoing example was prepared in a closed glass container rather than in the more conventional stainless steel beaker treated with nitric acid to oxidize surface metal ions. While not essential to the practice of this invention, the closed glass container is preferred to minimize both metal ion contamination and monomer evaporation. It is postulated that the presence of transition metals tends to cause gel by reaction with the free radical initiator, cumene hydroperoxide. Preferably, as described in the example, the reaction temperature is efficiently controlled simply by heating on a water bath. Heating is this manner will tend to eliminate undesirable local "hot spots" which may cause lumping of the polyurethane.

It is further to be noted that the above formulation was prepared in three mixing steps, the polyurethane being dissolved in the THFMA in the initial step, followed by the addition of MAA, TEGDMA and NTMPA in step two, and finally by the addition of the CHP. Mixing in the described manner will prevent yellowing and possible other stability problems which it is believed may possibly occur as the result of formation of a quinone-imide chromophoric system if the Estane 5712, a polyester-methylene phenyldiisocyanate is mixed initially with the MAA, NTMPA and TEGDMA.

The above stabilized adhesive formulation illustrating the practice of this invention was found to continue to exhibit the requisite shelf life stability more than one year after preparation. [Since it is still stable, the full extent of the shelf life is currently unknown.] It also was found stable after months of being subjected to accelerated aging at 45° C.

To recapitulate, the hydroxylamine additive of this invention has been found consistently to provide requisite shelf life. Specifically, it prevents the formation of free radicals which will cause premature gelation during storage. While not wishing to be limited to any particular theory for the kinetics of the stabilizing action, it is believed it may be illustrated as follows:

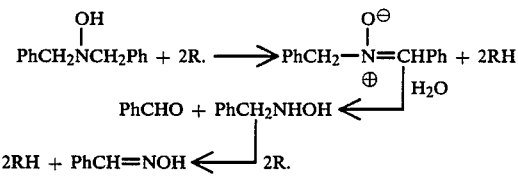

It has further been found that the hydroxylamine additive enhances the stability of the polyurethane against oxidation which causes a yellowing of the composition. Specifically, the pale yellow color of the composition of this invention is regarded to be more aesthetically pleasing than the brownish yellow product resulting from the same composition not containing the hydroxylamine additive.

The above-described composition was compared with a control (the same formulation without the hydroxylamine additive) for adhesive properties. They were found to be comparable except for an insignificant and acceptable slowing of fixture time of about 10 seconds (95 seconds vs. 85 seconds). A slight but entirely acceptable lowering of the impact strength of the adhesive from about 5.5 to about 4.3 was also noted. Comparative lap shear testing on steel and a thermoplastic substrate (acrylonitrile butadiene styrene) indicated no change.

Since certain changes may be made without departing from the scope of the invention herein involved, it is intended that all matter contained in the above description shall be interpreted as illustrative and not in a limiting sense.

I claim:

1. An acrylic composition comprising at least one free radical acrylic monomer and a free radical initiator, said composition further including a stabilizer mixture for providing improved shelf life for said composition, said stabilizer mixture comprising effective amounts of: (1) a hydroquinone polymerization inhibitor; (2) a metal chelating agent; and (3) a N,N-diarylalkyl or an N,N-dialkyl hydroxylamine-free radical scavenger.

2. A composition as defined in claim 1 wherein said inhibitor is hydroquinone.

3. A composition as defined in claim 1 wherein said scavenger is N,N-benzylhydroxylamne.

4. A composition as defined in claim 1 comprising a mixture of acrylic monomers.

5. A composition as defined in claim 4 wherein said mixture comprises a methacrylate and a dimethacrylate.

6. A composition as defined in claim 5 wherein said methacrylate is the major component of said composition.

7. A composition as defined in claim 1 wherein said composition comprises a two-part adhesive, the second part comprising an accelerator.

8. In a two-part acrylic adhesive consisting essentially of:
  (1) a first part comprising a composition including at least one free radical polymerizable monomer selected from the group consisting of acrylate and methacrylate esters; a free radical initiator; and a stabilizer for increasing the shelf life of said composition prior to admixture with the two part adhesive; and (2) a second part comprising a polymerization activator for said first part;
  the improvement wherein said stabilizer comprises a mixture of:
  (a) a hydroquinone polymerization inhibitor; (b) a metal chelating agent; and (c) a N,N-diarylalkyl hydroxylamine or an N,N-dialkyl hydroxylamine a free radical scavenger.

* * * * *